United States Patent
Terazono et al.

(10) Patent No.: US 9,588,642 B2
(45) Date of Patent: Mar. 7, 2017

(54) INFORMATION PROCESSING APPARATUS AND APPLICATION CONTROLLING METHOD

(71) Applicant: FUJITSU LIMITED, Kawasaki-shi, Kanagawa (JP)

(72) Inventors: Kohei Terazono, Hadano (JP); Akira Karasudani, Yamato (JP); Satoshi Iwata, Ebina (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 149 days.

(21) Appl. No.: 14/143,483

(22) Filed: Dec. 30, 2013

(65) Prior Publication Data
US 2014/0237426 A1    Aug. 21, 2014

(30) Foreign Application Priority Data
Feb. 21, 2013    (JP) .................. 2013-031988

(51) Int. Cl.
| | | |
|---|---|---|
| G06F 3/048 | (2013.01) | |
| G06F 3/0481 | (2013.01) | |
| G06F 3/0482 | (2013.01) | |
| G06F 9/445 | (2006.01) | |
| G06F 11/30 | (2006.01) | |
| H04M 1/725 | (2006.01) | |

(52) U.S. Cl.
CPC ........ G06F 3/04817 (2013.01); G06F 3/0482 (2013.01); G06F 9/445 (2013.01); G06F 11/30 (2013.01); H04M 1/72572 (2013.01); H04M 1/72586 (2013.01)

(58) Field of Classification Search
CPC ... G06F 9/4446; G06F 11/3438; G06F 11/302
See application file for complete search history.

(56) References Cited

U.S. PATENT DOCUMENTS 5,602,997 A * 2/1997 Carpenter ............. G06F 3/0481
715/764
6,308,157 B1 * 10/2001 Vanbuskirk ............. G10L 15/26
704/240

(Continued)

FOREIGN PATENT DOCUMENTS

| JP | 2005-229310 | 8/2005 |
|---|---|---|
| JP | 2009-130880 | 6/2009 |

(Continued)

OTHER PUBLICATIONS

Japanese Office Action dated Oct. 4, 2016 in corresponding Japanese Patent Application No. 2013-031988.

*Primary Examiner* — Matthew Ell
*Assistant Examiner* — Mohamed Abou El Seoud
(74) *Attorney, Agent, or Firm* — Staas & Halsey LLP

(57) ABSTRACT

An application control method executed by an information processing apparatus the application control method includes: determining a first application from among a plurality of applications that were activated after inactivation of a second application, according to time periods from a time of the inactivation to a time when each of the plurality of the applications were activated, when the second application enters active state, and presenting the first application after another inactivation of the second application.

9 Claims, 12 Drawing Sheets

(56) References Cited

U.S. PATENT DOCUMENTS

| | | | | |
|---|---|---|---|---|
| 7,284,009 B2* | 10/2007 | Perrow | ................ | G06F 3/0237 |
| 8,606,328 B2* | 12/2013 | Anzai | ............... | H04M 1/72586 |
| | | | | 455/566 |
| 8,655,819 B1* | 2/2014 | Burkard | ............... | G06N 99/005 |
| | | | | 706/45 |
| 2008/0228685 A1* | 9/2008 | Shivaji-Rao | .......... | G06F 9/4443 |
| | | | | 706/46 |
| 2010/0107141 A1* | 4/2010 | Fitzmaurice | .......... | G06F 17/276 |
| | | | | 717/123 |
| 2010/0222113 A1 | 9/2010 | Anzai | | |
| 2010/0323750 A1 | 12/2010 | Tomita | | |
| 2011/0126154 A1* | 5/2011 | Boehler | ................ | G06F 9/4446 |
| | | | | 715/811 |
| 2012/0015693 A1* | 1/2012 | Choi | ................ | H04M 1/72566 |
| | | | | 455/566 |
| 2013/0187753 A1* | 7/2013 | Chiriyankandath | .. | G06F 3/0488 |
| | | | | 340/5.51 |

FOREIGN PATENT DOCUMENTS

| | | |
|---|---|---|
| JP | 2012-3486 | 1/2012 |
| WO | 2008/096596 | 8/2008 |

* cited by examiner

FIG. 3

| APPLICATION ID 20A | APPLICATION NAME 20B | ACTIVATION DATE AND TIME 20C | TERMINATION DATE AND TIME 20D | ACTIVATION LOCATION 20E |
|---|---|---|---|---|
| 1 | BROWSER | 2012/12/24 10:32:45 | 2012/12/24 10:33:50 | Lat:35.5824547, Lon:139.6424089 |
| 2 | HOME | 2012/12/24 10:33:50 | 2012/12/24 11:01:00 | Lat:35.5824547, Lon:139.6424089 |
| 3 | CALENDAR | 2012/12/24 11:01:00 | 2012/12/24 11:05:21 | Lat:35.5824547, Lon:139.6424089 |
| 4 | MAIL | 2012/12/24 11:05:21 | | Lat:35.5824547, Lon:139.6424089 |

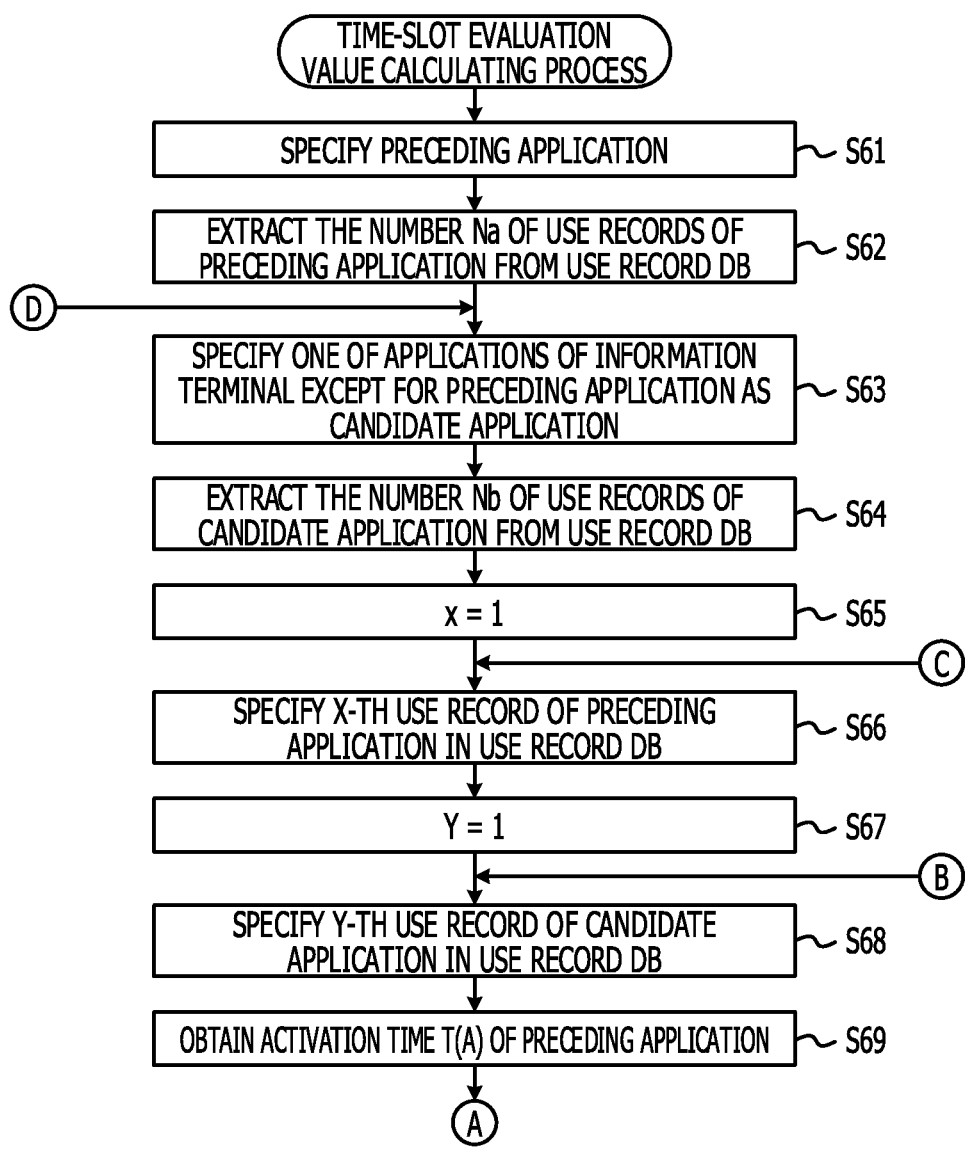

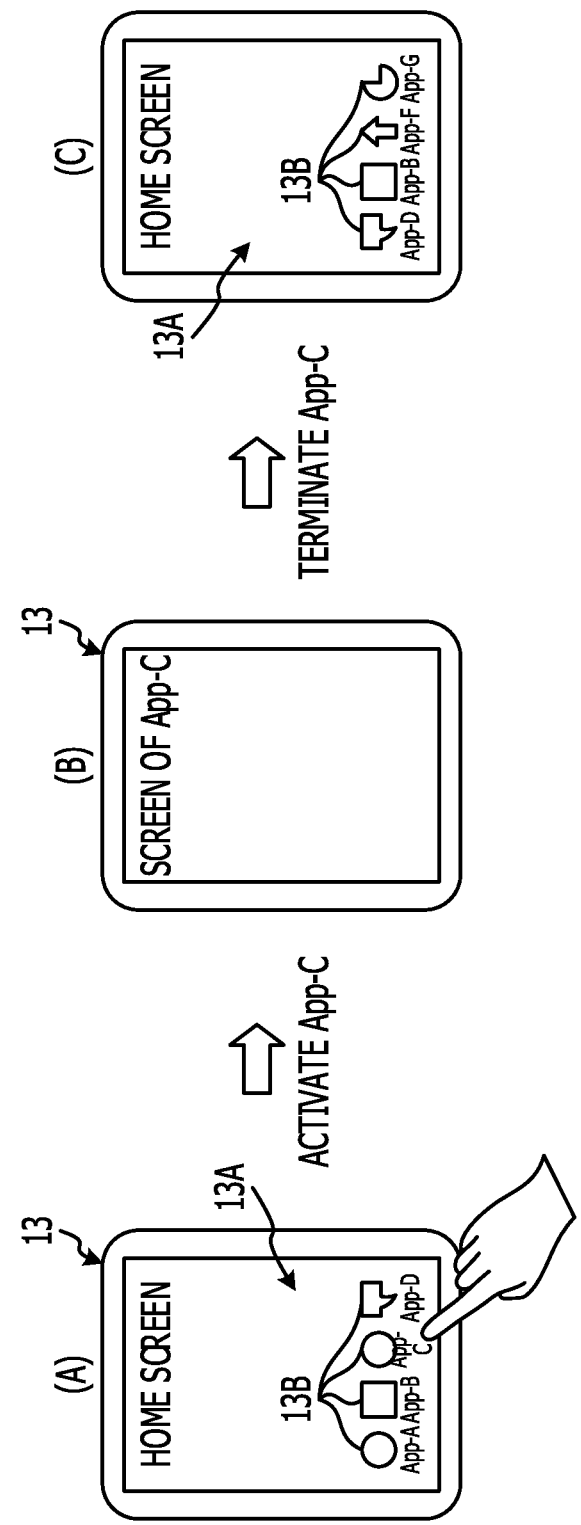

INFORMATION PROCESSING APPARATUS AND APPLICATION CONTROLLING METHOD

CROSS-REFERENCE TO RELATED APPLICATION

This application is based upon and claims the benefit of priority of the prior Japanese Patent Application No. 2013-031988, filed on Feb. 21, 2013, the entire contents of which are incorporated herein by reference.

FIELD

The embodiment discussed herein is related to an information processing apparatus and a method for selecting an application.

BACKGROUND

An information processing apparatus including a smart phone displays a plurality of icons serving as shortcuts of applications in a home screen and prompts a user to select one of the icons displayed in the home screen so as to activate an application corresponding to the selected icon, for example.

However, when an application currently used is to be switched to a target application in a state in which a number of applications have been installed, a user performs a complicated operation to find the target application in a number of applications.

In order to reduce such a load of the operation performed by the user, International Publication Pamphlet No. WO2008/096596 discloses a system in which an application to be used next is automatically recommended in accordance with situations of use of applications by the user. The recommendation system obtains and manages past generation situations in which events generated before applications are activated, time points of the generation, and positions of the generation are associated with each other for individual applications as a history. When detecting generation of an event, the recommendation system searches for an application corresponding to a past generation situation similar to a current generation situation with reference to the history and recommends the application to a user.

Furthermore, Japanese Laid-open Patent Publication No. 2005-229310 discloses a system in which a combination of commands frequently used is registered in a menu as a single command menu with reference to a history. The system is different from the technique of recommending a target application selected from among a number of applications to a user.

SUMMARY

According to an aspect of the invention, an application control method executed by an information processing apparatus the application control method includes: determining a first application from among a plurality of applications that were activated after inactivation of a second application, according to time periods from a time of the inactivation to a time when each of the plurality of the applications were activated, when the second application enters active state, and presenting the first application after another inactivation of the second application.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an exemplary usage history DB;

FIGS. 7A and 7B are a flowchart illustrating an exemplary processing operation of the processor included in the information terminal which relates to a time-slot evaluation value calculating process;

FIG. 10 is a diagram illustrating an exemplary screen change of the information terminal which relates to the recommended-application displaying process.

DESCRIPTION OF EMBODIMENT

In the recommendation system described above, when a past generation situation and a current generation situation are similar to each other, it is merely estimated that an application used in the past is currently used. However, an application to be recommended is determined in accordance with an event generated before a certain application is activated. Therefore, even when the event and the certain application do not relate to each other, the application is recommended to a user in accordance with a history. Specifically, in the recommendation system, in a case where a fact that a first application which does not relate to a second application is activated after an operation of the second application is terminated is managed as a history, for example, the first application which does not relate to the second application is recommended to the user after the operation of the second application is terminated irrespective of the user's will.

According to one aspect of the technique disclosed in this embodiment, an object is to recommend an application which relates to a certain application.

Hereinafter, an embodiment of an information processing apparatus, a method for changing application arrangement, and a program for changing application arrangement will be described in detail with reference to the accompanying drawings. The disclosed technique is not limited to this embodiment. Furthermore, components of this embodiment described below may be combined with each other as long as the consistency is maintained.

Figure 1:
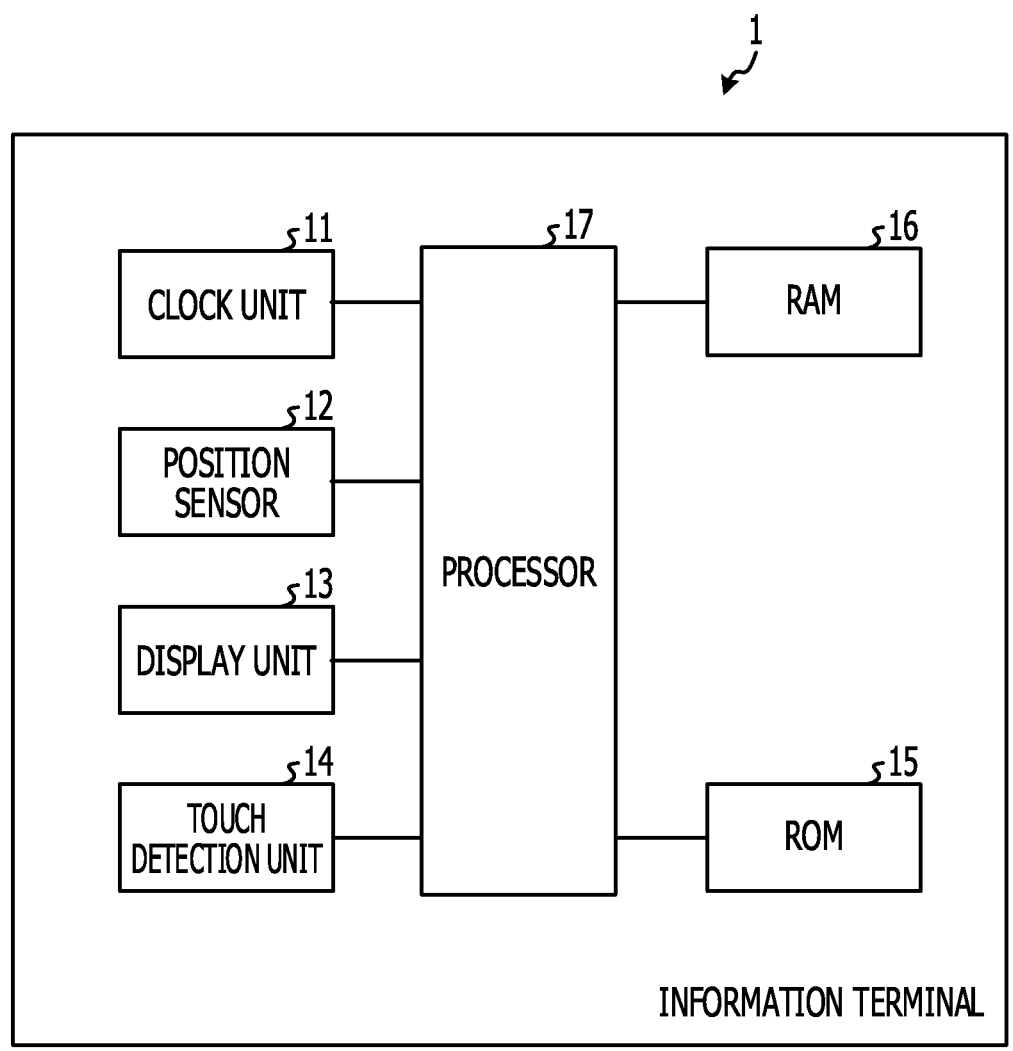
FIG. 1 is a block diagram illustrating an exemplary information terminal according to an embodiment.

FIG. 1 is a block diagram illustrating an exemplary information terminal according to this embodiment. An information terminal 1 illustrated in FIG. 1 is an information processing apparatus such as a smart phone or a tablet terminal. The information terminal 1 includes a clock unit 11, a position sensor 12, a display unit 13, a touch detection unit 14, a read only memory (ROM) 15, a random access memory (RAM) 16, and a processor 17. The clock unit 11 measures a current time. The position sensor 12 measures a current position of the information terminal 1 using a longitude and latitude. The display unit 13 serves as an output interface which displays various information in a screen. The touch detection unit 14 serves as an input interface which detects a touch operation performed on the display screen of the display unit 13. The ROM 15 serves as a storage unit which stores various information such as various programs and the like of applications and an OS, for example. The RAM 16 serves as a storage unit which stores use records of used applications, for example. The processor 17 controls the entire information terminal 1.

Figure 2:
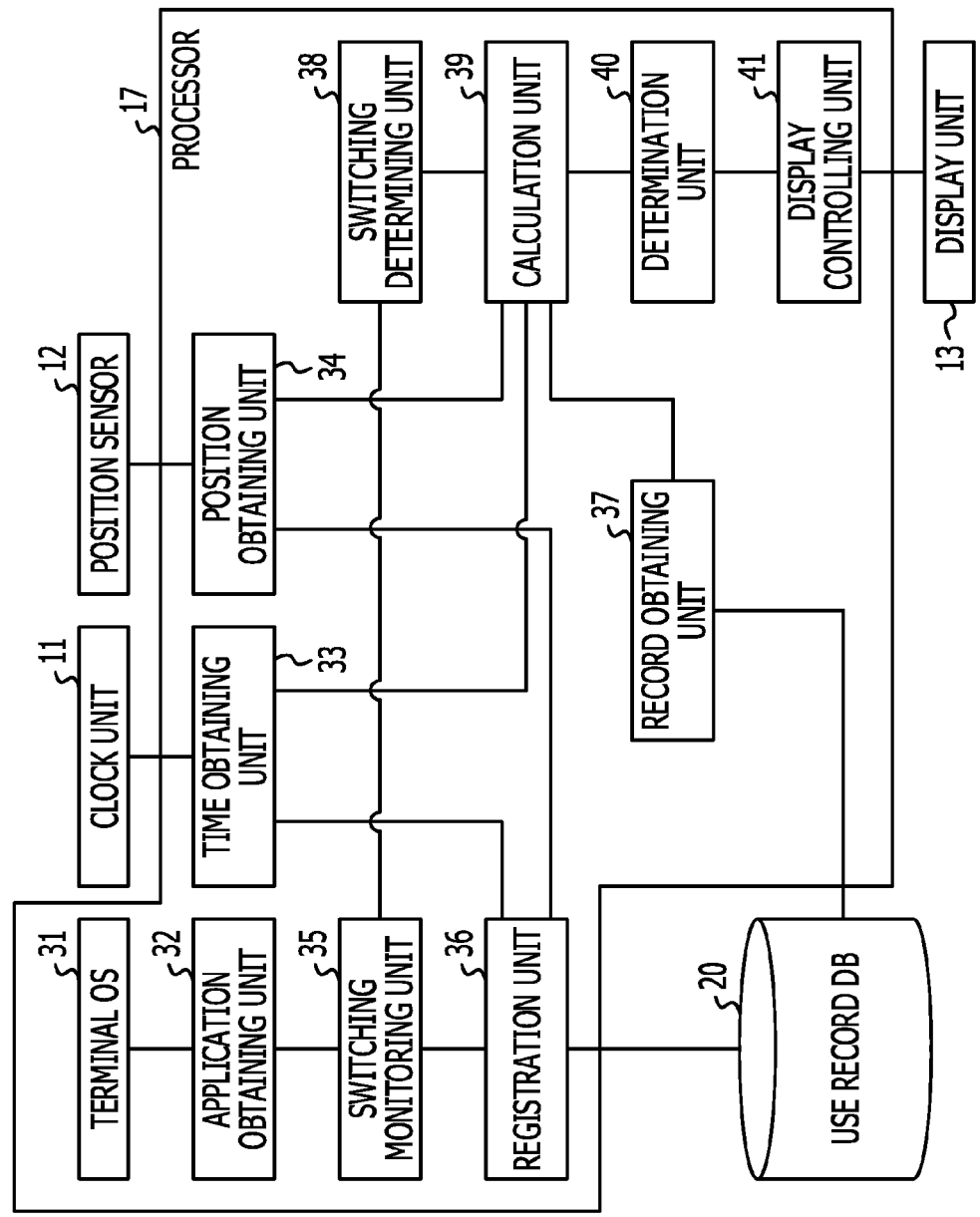
FIG. 2 is a block diagram illustrating an exemplary functional block of the information terminal.

FIG. 2 is a block diagram illustrating an exemplary functional block of the processor 17 included in the information terminal 1. The processor 17 reads the programs stored in the ROM 15 and executes various functions as processes in accordance with the read programs. The processor 17 includes a terminal OS 31, an application obtaining unit 32, a time obtaining unit 33, a position obtaining unit 34, a switching monitoring unit 35, a registration unit 36, and a record obtaining unit 37. The processor 17 further includes a switching determining unit 38, a calculation unit 39, a determination unit 40, and a display controlling unit 41. The terminal OS 31 is an operating system executed by the information terminal 1. The application obtaining unit 32 obtains a name and an ID of an application currently used by a user. The time obtaining unit 33 obtains a current time from the clock unit 11. The time obtaining unit 33 obtains a time point when a currently-used application is activated and a time point when the currently-used application is deactivated, for example. The position obtaining unit 34 obtains a current position from the position sensor 12. For example, the position obtaining unit 34 obtains a position where the currently-used application is activated.

The switching monitoring unit 35 monitors a start of use of an application (a change of a foreground task) and an end of the use of the application (a change of a background task). The switching monitoring unit 35 monitors a state of the currently-used application so as to monitor switching between applications including switching from the currently-used application to a home screen application and switching from the home screen application to another application. The switching determining unit 38 detects switching between applications in accordance with a result of the monitoring performed by the switching monitoring unit 35.

The registration unit 36 registers a use record of a currently-used application in a use record DB 20 included in the RAM 16. FIG. 3 is a diagram illustrating an example of the use record DB 20. The use record DB 20 illustrated in FIG. 3 manages use records such that an application ID 20A, an application name 20B, an activation date and time 20C, a termination date and time 20D, and an activation position 20E are associated with one another. The registration unit 36 registers a name, an ID, an activation date and time, and an activation position of the currently-used application which are associated with one another in the use record DB 20 as a use record. The application obtaining unit 32 periodically obtains information on the currently-used application. The registration unit 36 further registers a date and time of termination of an application in the use record DB 20 as the use record.

When detecting switching between applications, the record obtaining unit 37 obtains use records of a preceding application used before the switching with reference to the use record DB 20 and obtains use records of candidate applications used after the preceding application for individual use records of the preceding application. The record obtaining unit 37 includes an extraction unit, a time extraction unit, and a position extraction unit, for example. Assuming that an application A is switched to the home screen application, when the home screen application is currently used, the application A corresponds to the preceding application. When the number of use records of the preceding application is X, the record obtaining unit 37 successively obtains use records of candidate applications corresponding to the use records of the preceding application. Note that the candidate applications are used after the preceding application for individual use records of the preceding application.

When detecting switching between applications, the record obtaining unit 37 obtains, from the use record DB 20, the use records of the preceding application and the use records of the candidate applications used after the preceding application, as individual use records of the preceding application. Specifically, the record obtaining unit 37 obtains the use records of the preceding application and the use records of the candidate applications from the use record DB 20 for calculation of recommendation evaluation values representing the combination relationships corresponding to periods of time in which the preceding application is switched to the candidate applications.

Furthermore, when detecting the switching between applications, the record obtaining unit 37 successively obtains time points when the preceding application is activated, time points when the candidate applications which are different from the preceding application are activated from the use record DB 20. The activation times are obtained by removing date information from the activation date and times of the use records. Specifically, the record obtaining unit 37 obtains the activation times of the preceding application and the activation times of the candidate applications from the use record DB 20 for calculation of recommendation evaluation values representing the time-slot relationships corresponding to time differences between the activation times of the preceding application and the activation times of the candidate applications.

Furthermore, when detecting the switching between applications, the record obtaining unit 37 successively obtains positions where the preceding application is activated and positions where the candidate applications which are different from the preceding application are activated from the use record DB 20. Specifically, the record obtaining unit 37 obtains the activation positions of the preceding application and the activation positions of the candidate applications from the use record DB 20 for calculation of recommendation evaluation values representing the location relationships corresponding to the locations of the activation positions of the preceding application and the candidate applications.

The calculation unit 39 calculates the recommendation evaluation values representing the combination relationships between the preceding application and the candidate applications in accordance with the termination date and times of the preceding application and the activation date and times of the candidate applications obtained by the record obtaining unit 37. The calculation unit 39 includes a first determination unit, a first calculation unit, a second calculation unit, a second determination unit, a third calculation unit, a third determination unit, and a fourth calculation unit. Furthermore, the calculation unit 39 calculates the recommendation evaluation values representing the time-slot relationships between the preceding application and the candidate applications in accordance with the activation date and times of the preceding application and the activation date and times of the candidate applications obtained by the record obtaining unit 37. Moreover, the calculation unit 39 calculates the recommendation evaluation values representing the location relationships between the preceding application and the candidate applications in accordance with the activation positions of the preceding application and the activation positions of the candidate applications obtained by the record obtaining unit 37.

The determination unit 40 accumulates the recommendation evaluation values representing the combination relationships, the recommendation evaluation values representing the time-slot relationships, the recommendation evaluation values representing the location relationships which are calculated by the calculation unit 39 for individual candidate applications relative to the preceding application so as to obtain recommendation evaluation values representing the relationships. The determination unit 40 includes an accumulation unit and a ranking determination unit, for example. Furthermore, the determination unit 40 sorts the recommendation evaluation values in descending order in accordance with a result of the accumulation of the recommendation evaluation values of the candidate applications relative to the preceding application and determines recommendation ranking of recommended applications which are the candidate applications ranked in the top four, for example, in accordance with a result of the sorting.

The display controlling unit 41 obtains icons such as buttons of shortcuts of the recommended applications in accordance with the recommendation ranking determined by the determination unit 40 and displays icons 13B of the recommended applications in a recommended-application display region 13A of a home screen of the display unit 13 as illustrated in FIG. 10.

Figure 4:
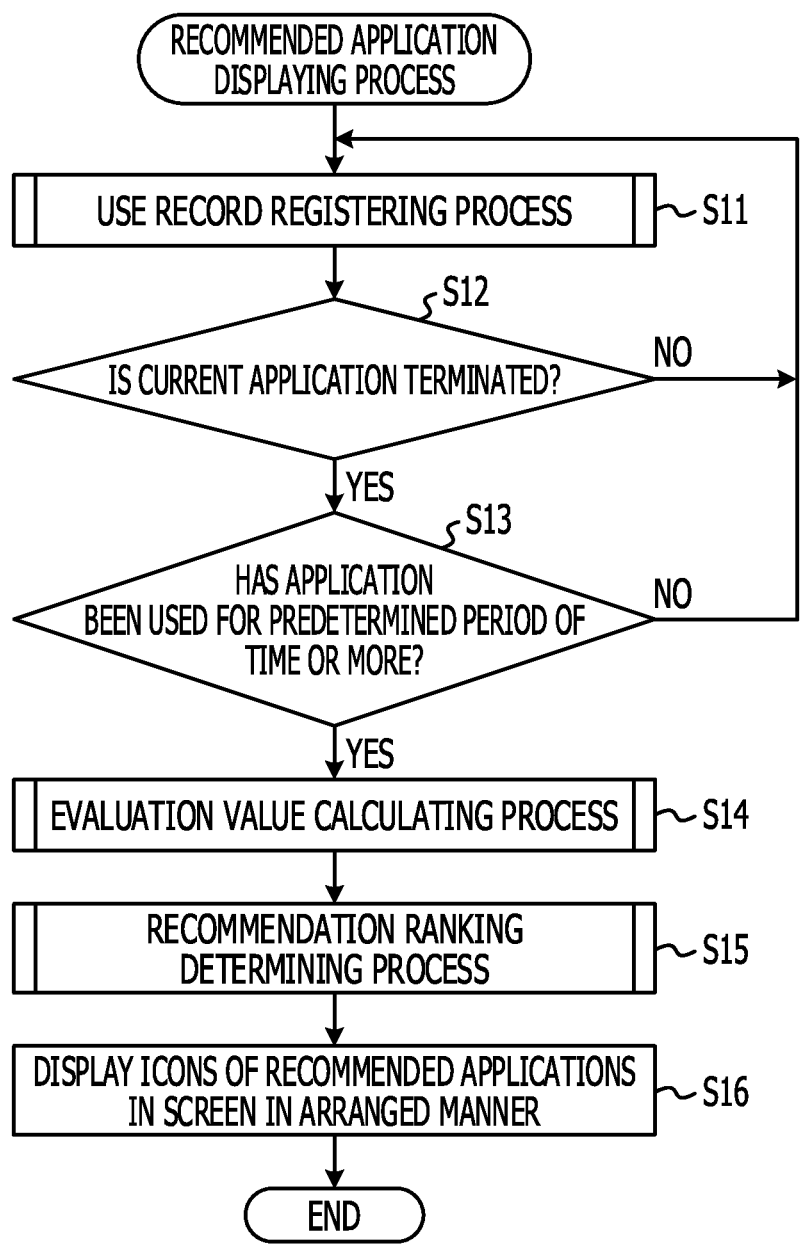
FIG. 4 is a flowchart illustrating an exemplary processing operation of a processor included in the information terminal which relates to a recommended-application displaying process.

Next, operation of the information terminal 1 of this embodiment will be described. FIG. 4 is a flowchart illustrating an exemplary processing operation of the processor 17 included in the information terminal 1 which relates to a recommended-application displaying process. In the recommended-application displaying process illustrated in FIG. 4, the recommendation ranking of the recommended applications is determined in accordance with the recommendation evaluation values of the candidate applications relative to the preceding application with reference to the use record DB 20 and the icons 13B of the recommended applications are displayed in the screen of the display unit 13 in accordance with the recommendation ranking.

In FIG. 4, the processor 17 performs a use record registering process which will be described with reference to FIG. 5 (step S11). In the use record registering process, information on a record of a used application is registered in the use record DB 20. After the use record registering process, the processor 17 determines whether a current application is terminated (step S12). When the current application is terminated (Yes in step S12), the processor 17 determines whether the terminated application was used for a predetermined period of time or more (step S13). Note that the process of determining whether the terminated application was used for a predetermined period of time or more is performed to determine whether the terminated application is intentionally used by a user. When the terminated application was used for a predetermined period of time or more (Yes in step S13), the processor 17 determines that the terminated application is intentionally used by the user and executes an evaluation value calculating process which will be described below on the terminated application, that is, the preceding application (step S14).

Furthermore, after the evaluation value calculating process, the processor 17 executes a recommendation ranking determining process which will be described below for the preceding application (step S15). After the recommendation ranking determining process, the processor 17 displays the icons 13B of the shortcuts of the recommended applications in an arranged manner in the home screen of the display unit 13 in accordance with the recommendation ranking of the recommended applications (step S16). Thereafter, the processing operation of FIG. 4 is terminated.

When the current application is not terminated (No in step S12), the processor 17 returns to step S11 to perform the use record registering process. Furthermore, when the terminated application was not used for a predetermined period of time or more (No in step S13), the processor 17 determines that the terminated application is not intentionally used by the user and returns to step S11 to execute the use record registering process.

The processor 17 which executes the recommended-application displaying process illustrated in FIG. 4 successively calculates the recommendation evaluation values of the candidate applications relative to the preceding application with reference to the use record DB 20. The processor 17 determines the recommendation ranking of the recommended applications for the preceding application in accordance with the recommendation evaluation values of the candidate applications. The processor 17 displays the icons 13B of the recommended applications in the screen of the display unit 13 in accordance with the recommendation ranking of the recommended applications. As a result, the information terminal 1 displays the icons 13B in the display screen so as to offer the recommended applications for the preceding application while the user's will is reflected.

Figure 5:
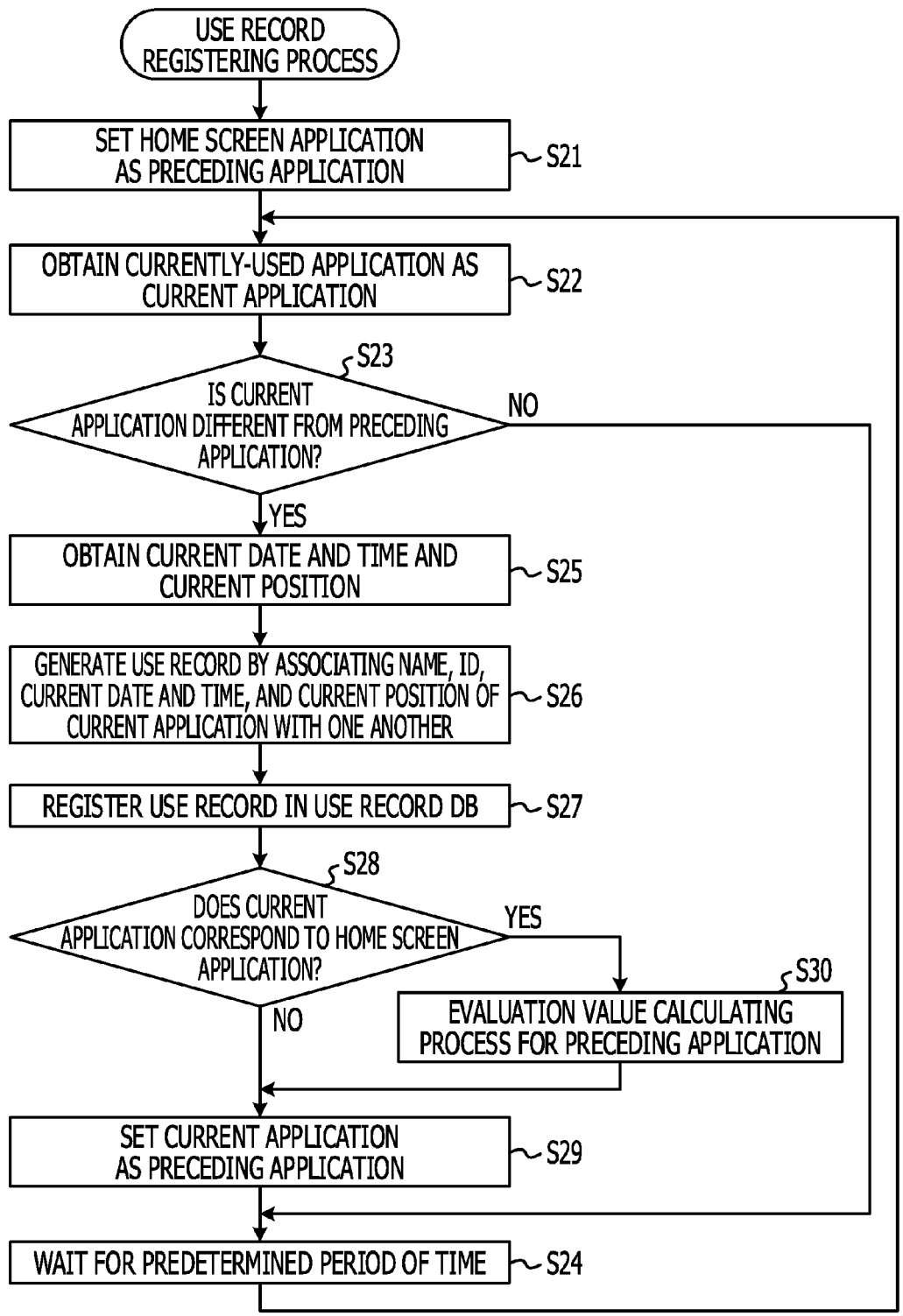
FIG. 5 is a flowchart illustrating an exemplary processing operation of the processor included in the information terminal which relates to a use record registering process.

FIG. 5 is a flowchart illustrating an exemplary processing operation of the processor 17 included in the information terminal 1 which relates to the use record registering process. In the use record registering process of FIG. 5, when switching between applications is detected, a use record of the preceding application is obtained and the obtained use record of the preceding application is registered in the use record DB 20.

In FIG. 5, the processor 17 sets a home screen application as the preceding application (step S21). The application obtaining unit 32 of the processor 17 obtains a currently-used application as a current application (step S22). Note that the application obtaining unit 32 periodically checks the currently-used application executed in a foreground task. The switching determining unit 38 of the processor 17 determines whether the current application and the preceding application are different from each other (step S23).

When the current application and the preceding application are not different from each other (No in step S23), the switching determining unit 38 determines that switching between applications has not been performed since the current application and the preceding application are the same as each other. When the current application and the preceding application are not different from each other, the switching monitoring unit 35 of the processor 17 waits for a predetermined period of time, for example, three seconds (step S24), and returns to step S22 where a currently-used application is obtained as a current application. Note that the switching monitoring unit 35 monitors the currently-used application through the application obtaining unit 32.

When the current application and the preceding application are different from each other (Yes in step S23), the time obtaining unit 33 and the position obtaining unit 34 of the processor 17 determine that the switching between applications has been performed and obtain a current date and time and a current position of the information terminal 1 (step S25). The registration unit 36 of the processor 17 generates a use record including a name, an ID, a current date and time (activation time), a current position (activation position), and the like of the current application which are associated with one another (step S26) and registers the use record in the use record DB 20 (step S27).

After the use record is registered in the use record DB 20, the switching determining unit 38 of the processor 17 determines whether the current application is the home screen application (step S28). When the current application is not the home screen application (No in step S28), the switching determining unit 38 sets the current application as the preceding application (step S29) and proceeds to step S24 where the processor 17 waits for the predetermined period of time.

Furthermore, when the current application is the home screen application (Yes in step S28), the calculation unit 39 of the processor 17 performs the process of calculating evaluation values for the preceding application (step S30) and proceeds to step S29 where the current application is set as the preceding application. In the process of calculating evaluation values for the preceding application, recommendation evaluation values representing the relationships between the preceding application and the candidate applications are calculated. The recommendation evaluation values representing the relationships include the recommendation evaluation values representing the relationships of use combinations between the preceding application and the candidate applications, the recommendation evaluation values representing the relationships of use time slots between the preceding application and the candidate applications, and the recommendation evaluation values representing the relationships of use locations between the preceding application and the candidate applications. The evaluation value calculating process includes a combination evaluation value calculating process, a time-slot evaluation value calculating process, and a location evaluation value calculating process.

When the current application is different from the preceding application, the registration unit 36 performing the use record registering process of FIG. 5 registers a use record including an activation time and an activation position of the current application in the use record DB 20. Accordingly, the processor 17 may successively register use records of used applications in the use record DB 20.

Figure 6:
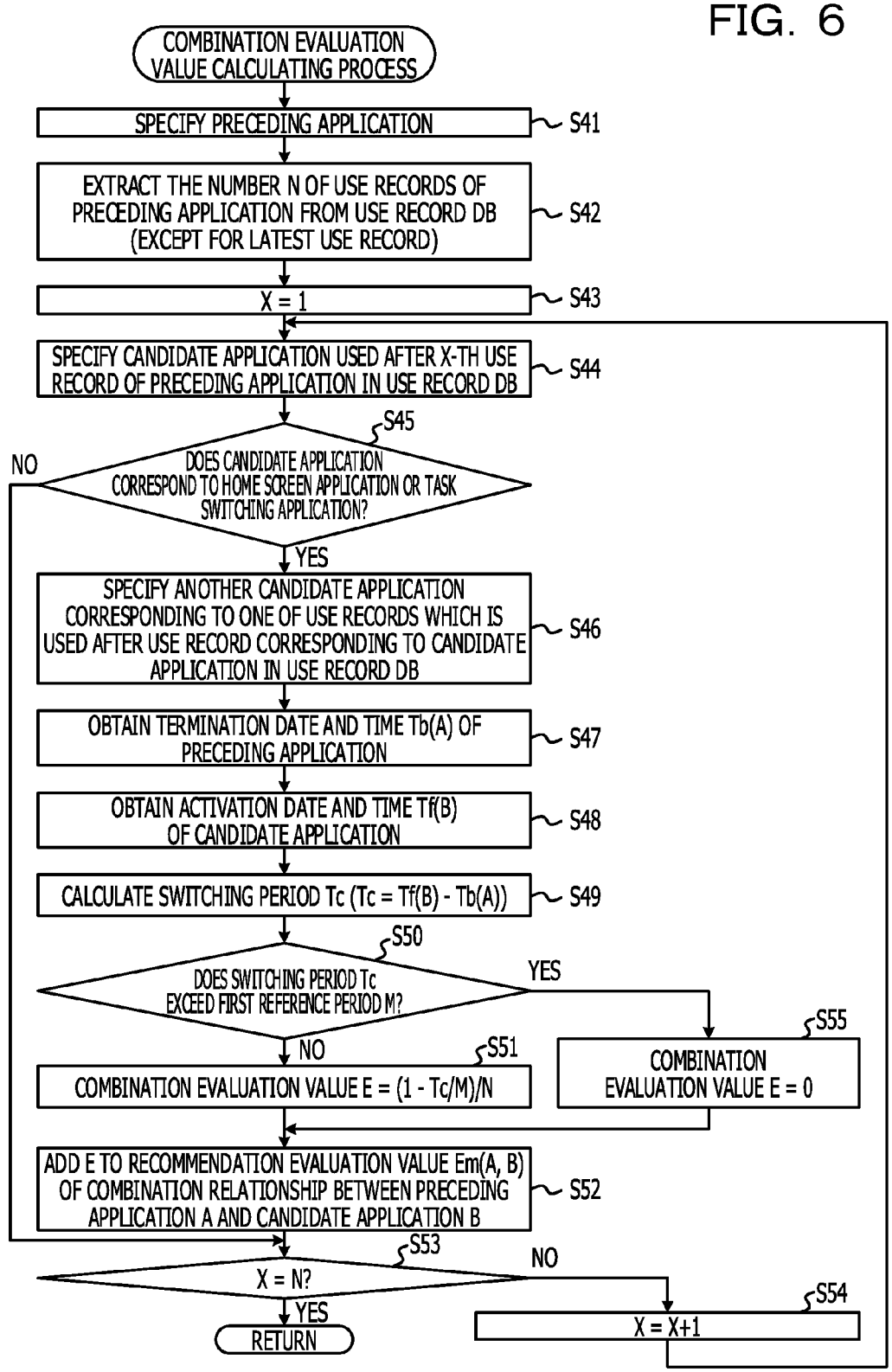
FIG. 6 is a flowchart illustrating an exemplary processing operation of the processor included in the information terminal which relates to a combination evaluation value calculating process.

FIG. 6 is a flowchart illustrating an exemplary processing operation of the processor 17 included in the information terminal 1 which relates to the combination evaluation value calculating process. The combination evaluation value calculating process of FIG. 6 includes a process of calculating combination evaluation values of the candidate applications which correspond to switching periods obtained for individual candidate applications relative to the preceding application and a process of calculating recommendation evaluation values which represent the combination relationships while the combination evaluation values are reflected for individual candidate applications.

In FIG. 6, the record obtaining unit 37 of the processor 17 specifies a preceding application (step S41) and extracts the number N of use records of the preceding application from the use record DB 20 (step S42). Note that, when the record obtaining unit 37 obtains the number N of use records of the preceding application from the use record DB 20, the latest use record of the preceding application is excepted from the number of use records.

After obtaining the number N of use records of the preceding application, the record obtaining unit 37 sets X to a first use record so that one of the obtained use records of the preceding application is specified (step S43). The record obtaining unit 37 specifies a candidate application used after the X-th use record of the preceding application in the use record DB 20 (step S44). The record obtaining unit 37 determines whether the candidate application specified in step S44 is the home screen application or a task switching application (step S45). When the specified candidate application is the home screen application or the task switching application (Yes in step S45), the record obtaining unit 37 specifies another candidate application corresponding to one of the use records which is used after the use record corresponding to the candidate application in the use record DB 20 (step S46). Note that the candidate applications represent applications which are used after the preceding application for individual use records of the preceding application and which are other than the home screen application and the task switching application. For example, assuming that the application A is switched to the home screen application and the home screen application is switched to an application B, when the application A is set as a preceding application, the application B is a candidate application. Furthermore, the candidate applications correspond to applications other than the home screen application, the task switching application, and a launcher application which activates all applications of the information terminal 1 in a state in which all the applications are displayed as a list.

After specifying the candidate application, the record obtaining unit 37 obtains a termination date and time Tb(A) of the preceding application (step S47). The record obtaining unit 37 obtains an activation date and time Tf(B) of the candidate application (step S48). The calculation unit 39 included in the processor 17 calculates a switching period Tc for switching between the applications from the termination date and time Tb(A) of the preceding application to the activation date and time Tf(B) of the candidate application (step S49). Note that the calculation unit 39 calculates the switching period Tc by subtracting the termination date and time Tb(A) from the activation date and time Tf(B).

The calculation unit 39 determines whether the switching period Tc exceeds a first reference period M (step S50). Here, the first reference period M is a threshold value for a switching period for switching from the preceding application to the candidate application intentionally performed as a combination by the user, and is used to estimate that the combination relationship between the preceding application and the candidate application is strong. The first reference period M is 100 seconds, for example.

When the switching period Tc does not exceed the first reference period M (No in step S50), the calculation unit 39 determines that the combination relationship between the preceding application and the candidate application is strong and calculates a combination evaluation value E (E=((1−Tc/M)/N)) (step S51). Here, division using "N" in the expression "E=((1−Tc/M)/N)" is performed to normalize data. Specifically, as the switching period is shorter, the calculation unit 39 obtains a larger combination evaluation value.

After calculating the combination evaluation value E of the candidate application, the calculation unit 39 adds the combination evaluation value E of the candidate application to a recommendation evaluation value Em(A, B) representing the combination relationship between the preceding application and the candidate application (step S52). Note that the calculation unit 39 successively calculates the recommendation evaluation values representing the combination relationships between the preceding application and the candidate applications. The calculation unit 39 calculates the recommendation evaluation values representing the combination relationships between the preceding application and the candidate applications in accordance with past performance and adds the combination evaluation values of the candidate applications to the recommendation evaluation values of the candidate applications. Note that the past performance of the candidate applications represents the number of times the preceding application is switched to the candidate applications.

After calculating the recommendation evaluation values representing the combination relationships, the record obtaining unit 37 determines whether X corresponds to an N-th use record (step S53). When it is determined that X does not correspond to the N-th use record (No in step S53), the record obtaining unit 37 determines that at least one of the use records of the preceding application has not been specified and sets X to an (X+1)-th use record so as to specify the X-th use record of the preceding application (step S54). Thereafter, the record obtaining unit 37 returns to step S44 so as to specify a candidate application of the X-th use record set in step S54.

When X corresponds to the N-th use record (Yes in step S53), the record obtaining unit 37 determines that all the use records of the preceding application have been specified and the processing operation illustrated in FIG. 6 is terminated. Furthermore, when the specified candidate application is neither the home screen application nor the task switching application (No in step S45), the record obtaining unit 37 proceeds to step S53.

When the switching period Tc exceeds the first reference period M (Yes in step S50), the calculation unit 39 determines that the combination relationship between the preceding application and the candidate application is weak, sets 0 to the combination evaluation value E (step S55), and proceeds to step S52.

The processor 17 performing the combination evaluation value calculating process illustrated in FIG. 6 specifies candidate applications used after the preceding application for individual use records of the preceding application. The processor 17 calculates switching periods for switching from the preceding application to the candidate applications for individual use records of the preceding application and calculates combination evaluation values corresponding to the switching periods for individual candidate applications, and thereafter, the processor 17 calculates recommendation evaluation values representing the combination relationships in which the combination evaluation values are reflected for individual candidate applications.

The processor 17 calculates the recommendation evaluation values representing the combination relationships in accordance with the past performance of the candidate applications for individual use records of the preceding application.

When a switching period for switching from the preceding application to one of the candidate applications corresponding to the use records of the preceding application exceeds the first reference period M, the processor 17 determines that the combination relationship between the preceding application and the candidate application is weak and sets a combination evaluation value of the candidate application relative to the preceding application as 0.

When a switching period for switching from the preceding application to one of the candidate applications corresponding to the use records of the preceding application does not exceed the first reference period M, the processor 17 determines that the combination relationship between the preceding application and the candidate application is strong and sets a combination evaluation value of the candidate application relative to the preceding application comparatively high.

As a result, the processor 17 may calculate the recommendation evaluation values representing the combination relationships between the individual candidate applications and the preceding application by adding the combination evaluation values calculated for the individual candidate applications to the recommendation evaluation values corresponding to the past performance of the candidate applications relative to the preceding application.

Figure 7B:
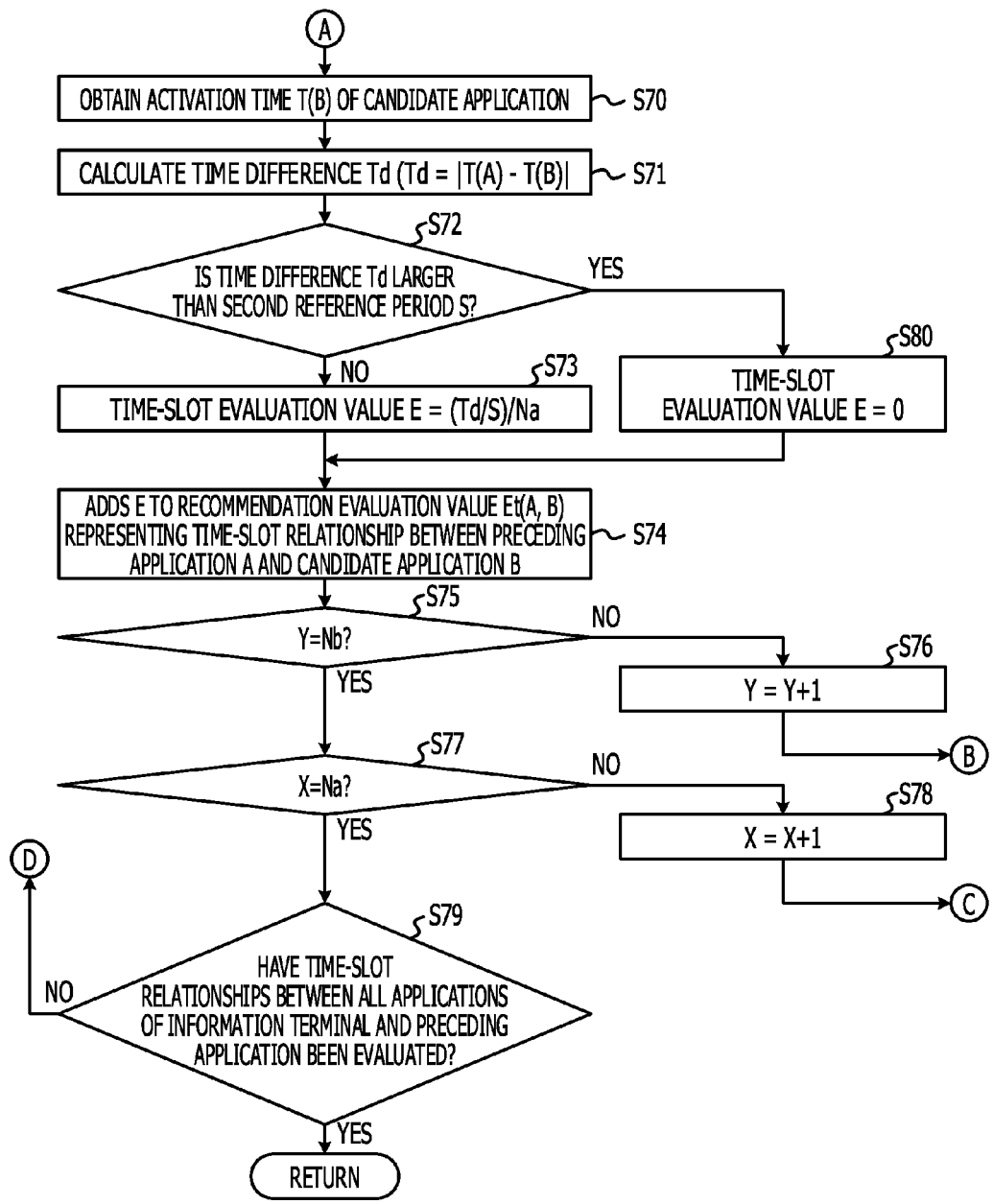

FIGS. 7A and 7B are a flowchart illustrating an exemplary processing operation of the processor 17 included in the information terminal 1 which relates to the time-slot evaluation value calculating process. The time-slot evaluation value calculating process includes a process of calculating time-slot evaluation values of the candidate applications corresponding to time differences between the activation times of the preceding application for individual use records and the activation times of the candidate applications relative to the preceding application and calculating recommendation evaluation values of the time-slot relationships in which the time-slot evaluation values are reflected for individual candidate applications.

In FIGS. 7A and 7B, the record obtaining unit 37 of the processor 17 specifies a preceding application (step S61) and extracts the number Na of use records of the preceding application from the use record DB 20 (step S62). Note that, when the record obtaining unit 37 extracts the number Na of use records of the preceding application from the use record DB 20, the latest use record of the preceding application is excepted from the number of use records.

After extracting the number Na of use records of the preceding application, the record obtaining unit 37 specifies one of the applications included in the information terminal 1 which is different from the preceding application as a candidate application (step S63). The record obtaining unit 37 extracts the number Nb of use records of the candidate application specified by the use record DB 20 (step S64). After extracting the number Nb of use records of the candidate application, the record obtaining unit 37 sets X to a first use record so that one of the use records is specified in the obtained use records of the preceding application (step S65). The record obtaining unit 37 specifies an X-th use record of the preceding application in the use record DB 20 (step S66).

The record obtaining unit 37 sets Y to a first use record so as to specify one of the use records of the candidate application (step S67) and specifies a Y-th use record of the candidate application in the use record DB 20 (step S68).

The record obtaining unit 37 obtains an activation time T(A) from the activation date and time of the preceding application with reference to the use record DB 20 (step S69). Furthermore, the record obtaining unit 37 obtains an activation time T(B) from the activation date and time of the candidate application with reference to the use record DB 20 (step S70). The calculation unit 39 calculates a time difference Td using the activation time T(A) of the preceding application and the activation time T(B) of the candidate application (step S71). Note that the calculation unit 39 calculates the time difference Td in accordance with the following equation:

$$Td=|T(A)-T(B)|.$$

The calculation unit 39 determines whether the time difference Td exceeds a second reference period S (step S72). The second reference period S is a threshold value for use of the preceding application and the candidate application in the same time slot by the user, and therefore, the second reference period S is a threshold value used to estimate that the time-slot relationship between the preceding application and the candidate application is strong. The second reference period S is four hours, for example.

When the time difference Td does not exceed the second reference period S (No in step S72), the calculation unit 39 determines that the time-slot relationship between the candidate application and the preceding application is strong and calculates a time-slot evaluation value E (E=((Td/S)/Na)) (step S73). Here, division using "Na" in the expression "E=((Td/S)/Na)" is performed to normalize data. Specifically, as the time difference is smaller, the calculation unit 39 obtains a larger time-slot evaluation value.

After calculating the time-slot evaluation value E of the candidate application, the calculation unit 39 adds the time-slot evaluation value E of the candidate application to a recommendation evaluation value Et(A, B) representing the time-slot relationship between the candidate application and the preceding application (step S74). Note that the calculation unit 39 successively calculates recommendation evaluation values representing the time-slot relationships between the preceding application and the candidate applications.

After calculating the recommendation evaluation value representing the time-slot association, the record obtaining unit 37 determines whether Y corresponds to an Nb-th use record (step S75). When it is determined that Y does not correspond to the Nb-th use record (No in step S75), the record obtaining unit 37 determines that at least one of the use records of the preceding application has not been specified and sets Y to a (Y+1)-th use record so as to specify the next use record of the candidate application (step S76). Thereafter, the record obtaining unit 37 returns to step S68 so as to specify the Y-th use record of the candidate application set in step S76.

When it is determined that Y corresponds to the Nb-th use record (Yes in step S75), the record obtaining unit 37 determines that all the use records of the candidate application have been specified and determines whether X corresponds to an Na-th use record (step S77). When it is determined that X does not correspond to the Na-th use record (No in step S77), the record obtaining unit 37 determines that at least one of the use records of the preceding application has not been specified and sets X to an (X+1)-th use record so as to specify the next use record of the preceding application (step S78). Thereafter, the record obtaining unit 37 returns to step S66 so as to specify the X-th use record of the preceding application set in step S78.

When it is determined that X corresponds to the Na-th use record (Yes in step S77), the calculation unit 39 determines that all the use records of the preceding application have been specified and determines whether the time-slot relationships between all the applications included in the information terminal 1 and the preceding application have been evaluated (step S79). Here, all the applications included in the information terminal 1 represent applications installed in the information terminal 1 except for the preceding application, the home screen application, and the task switching application.

When it is determined that the time-slot relationships between all the applications included in the information terminal 1 and the preceding application have been evaluated (Yes in step S79), the calculation unit 39 terminates the processing operation illustrated in FIGS. 7A and 7B. When it is determined that the time-slot relationship between at least one of the applications included in the information terminal 1 and the preceding application has not been evaluated (No in step S79), the record obtaining unit 37 returns to step S63 so as to specify one of the applications included in the information terminal 1.

When the time difference Td exceeds the second reference period S (Yes in step S72), the calculation unit 39 determines that the time-slot relationship between the preceding application and the candidate application is weak and sets 0 to the time-slot evaluation value E (step S80), and the process proceeds to step S74.

The processor 17 performing the time-slot evaluation value calculating process illustrated in FIGS. 7A and 7B calculates time differences between the activation times of the use records of the preceding application and the activation times of the candidate applications relative to the preceding application and calculates time-slot evaluation values of the candidate applications corresponding to the time differences. Furthermore, the processor 17 calculates the recommendation evaluation values of the candidate applications representing the time-slot relationships in which the time-slot evaluation values are reflected.

When the time difference between the preceding application and one of the candidate applications exceeds the second reference period S for each use record of the preceding application, the processor 17 determines that the time-slot relationship between the preceding application and the candidate application is weak and sets a time-slot evaluation value of the candidate application relative to the preceding application as 0.

When the time difference between the preceding application and one of the candidate applications does not exceed the second reference period S for each use record of the preceding application, the processor 17 determines that the time-slot relationship between the preceding application and the candidate application is strong and sets a time-slot evaluation value of the candidate application relative to the preceding application comparatively high. As a result, the processor 17 may calculate the recommendation evaluation values representing the time-slot relationships between the preceding application and the candidate applications by adding the time-slot evaluation values calculated for individual candidate applications to the recommendation evaluation values representing the time-slot relationships between the preceding application and the candidate applications.

Figure 8A:
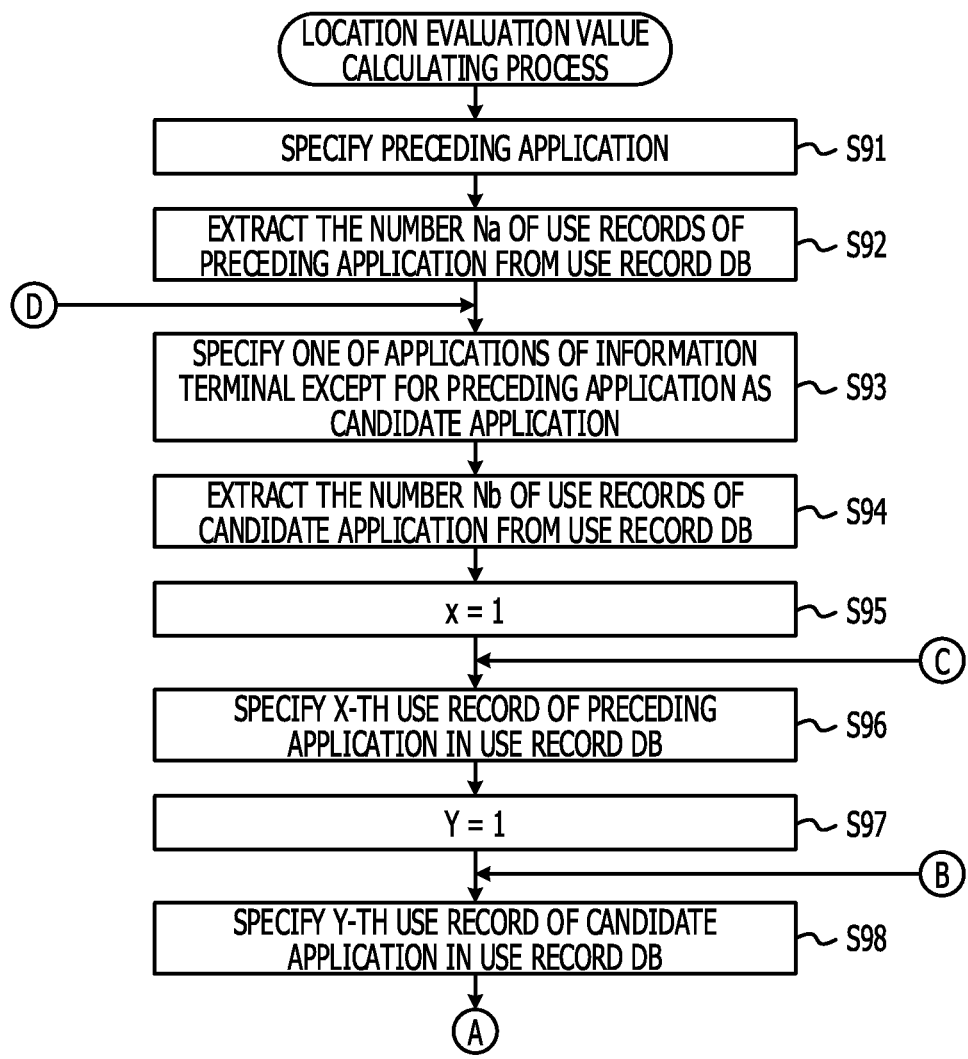
FIGS. 8A and 8B are a flowchart illustrating an exemplary processing operation of the processor included in the information terminal which relates to a location evaluation value calculating process.
Figure 8B:
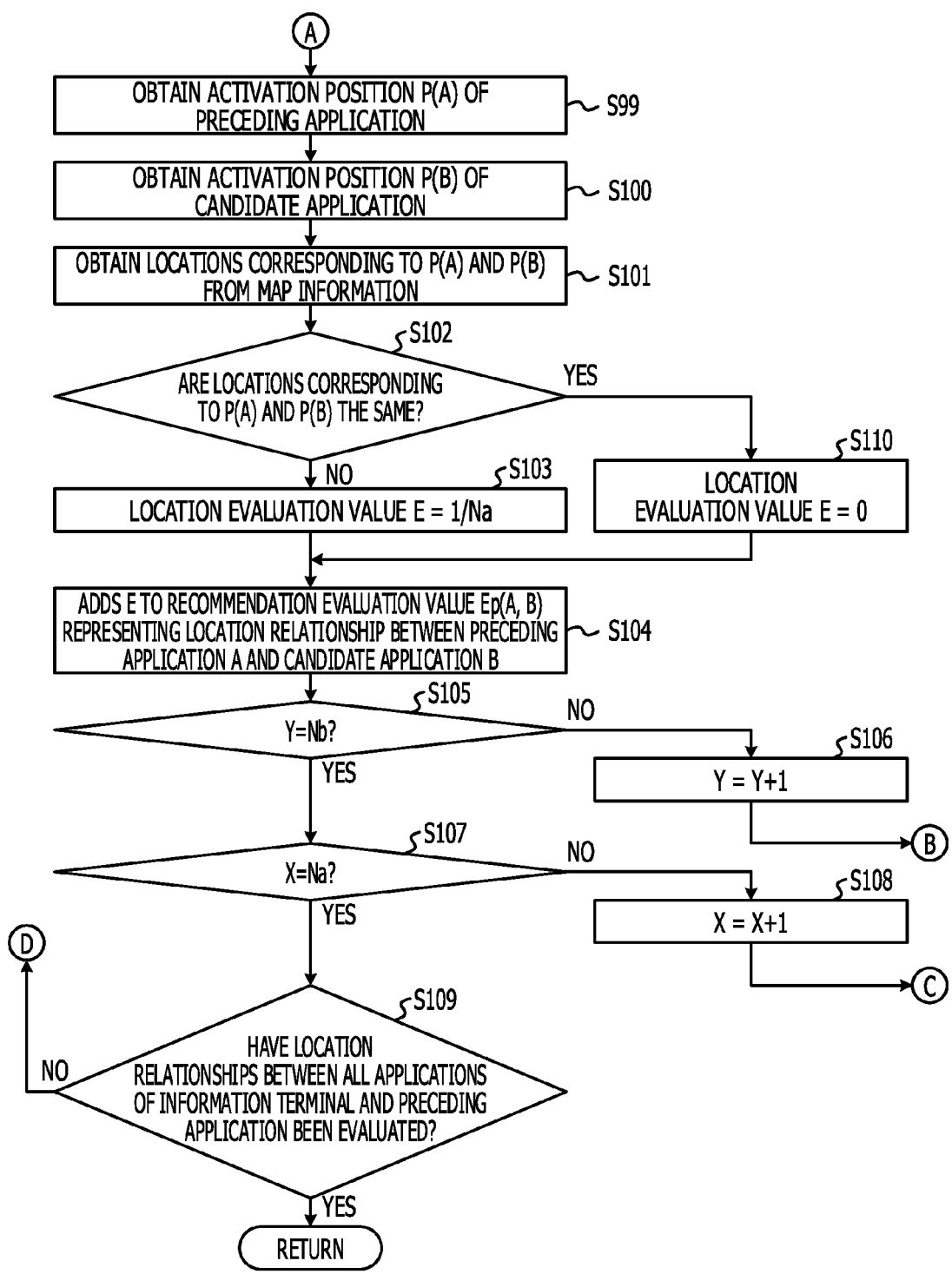

FIGS. 8A and 8B are a flowchart illustrating an exemplary processing operation of the processor 17 included in the information terminal 1 which relates to the location evaluation value calculating process. The location evaluation value calculating process includes a process of calculating location evaluation values of the candidate applications in accordance with results of determinations of activation positions of the use records of the preceding application and activation positions of the candidate applications relative to the preceding application and calculating recommendation evaluation values for individual candidate applications representing the location relationships in which the location evaluation values are reflected.

In FIGS. 8A and 8B, the record obtaining unit 37 of the processor 17 specifies a preceding application (step S91) and obtains the number Na of use records of the preceding application from the use record DB 20 (step S92). Note that, when the record obtaining unit 37 obtains the number Na of use records of the preceding application from the use record DB 20, the latest use record of the preceding application is excepted from the number of use records.

After obtaining the number Na of use records of the preceding application, the record obtaining unit 37 specifies one of the applications included in the information terminal 1 which is different from the preceding application as a candidate application (step S93). The record obtaining unit 37 obtains the number Nb of use records of the candidate application specified by the use record DB 20 (step S94). After obtaining the number Nb of use records of the candidate application, the record obtaining unit 37 sets X to a first use record so that one of the obtained use records of the preceding application is specified (step S95). The record obtaining unit 37 specifies an X-th use record of the preceding application in the use record DB 20 (step S96).

The record obtaining unit 37 sets Y to a first use record so as to specify one of the use records of the candidate application (step S97) and specifies a Y-th use record of the candidate application in the use record DB 20 (step S98).

The record obtaining unit 37 obtains an activation position P(A) of the preceding application with reference to the use record DB 20 (step S99). Furthermore, the record obtaining unit 37 obtains an activation position P(B) of the candidate application with reference to the use record DB 20 (step S100). The calculation unit 39 obtains a location corresponding to the activation position P(A) of the preceding application and a location corresponding to the activation position P(B) of the candidate application from map information not illustrated (step S101).

The calculation unit 39 determines whether the location corresponding to the activation position P(A) of the preceding application and the location corresponding to the activation position P(B) of the candidate application are the same as each other (step S102). When the location of the preceding application and the location of the candidate application are the same as each other (Yes in step S102), the calculation unit 39 determines that the location relationship between the preceding application and the candidate application is strong and calculates an evaluation value E of the location relationship (E=1/Na: division using Na is performed for normalization) (step S103). Here, even when a longitude and latitude of the activation position of the preceding application and a longitude and latitude of the activation position of the candidate application are different from each other, the preceding application and the candidate application may be activated in the same location such as the same building or the same station.

After calculating the location evaluation value E of the candidate application, the calculation unit 39 adds the location evaluation value E of the candidate application to a recommendation evaluation value Ep(A, B) representing the location relationship between the candidate application and the preceding application (step S104). Note that the calculation unit 39 successively calculates recommendation evaluation values representing the location relationships between the preceding application and the candidate applications.

After calculating the recommendation evaluation values representing the location relationships, the record obtaining unit 37 determines whether Y corresponds to an Nb-th use record (step S105). When it is determined that Y does not correspond to the Nb-th use record (No in step S105), the record obtaining unit 37 determines that at least one of the use records of the preceding application has not been specified and sets Y to a (Y+1)-th use record so as to specify the next use record of the candidate application (step S106). Thereafter, the record obtaining unit 37 returns to step S98 so as to specify the Y-th use record of the candidate application set in step S106.

When it is determined that Y corresponds to the Nb-th use record (Yes in step S105), the record obtaining unit 37 determines that all the use records of the candidate application have been specified and determines whether X corresponds to an Na-th use record (step S107). When it is determined that X does not correspond to the Na-th use record (No in step S107), the record obtaining unit 37 determines that at least one of the use records of the preceding application has not been specified and sets X to an (X+1)-th use record so as to specify the next use record of the preceding application (step S108). Thereafter, the record obtaining unit 37 returns to step S96 so as to specify the X-th use record of the preceding application set in step S108.

When it is determined that X corresponds to the Na-th use record (Yes in step S107), the history obtaining unit 39 determines that all the use records of the preceding application have been specified and determines whether the location relationships between all the applications included in the information terminal 1 and the preceding application have been evaluated (step S109). Here, all the applications included in the information terminal 1 represent applications installed in the information terminal 1 except for the preceding application, the home screen application, and the task switching application.

When it is determined that the location relationships between all the applications included in the information terminal 1 and the preceding application have been evaluated (Yes in step S109), the calculation unit 39 terminates the processing operation illustrated in FIGS. 8A and 8B. When it is determined that the location relationship between at least one of the applications included in the information terminal 1 and the preceding application has not been evaluated (No in step S109), the record obtaining unit 37 returns to step S93 so as to specify one of the applications included in the information terminal 1.

When determining that the location corresponding to the activation position P(A) of the preceding application and the location corresponding to the activation position P(B) of the candidate application are not the same as each other (No in step S102), the calculation unit 39 determines that the location relationship between the preceding application and the candidate application is weak. Then the calculation unit 39 sets 0 to the location evaluation value E (step S110) and proceeds to step S104.

The processor 17 performing the location evaluation value calculating process illustrated in FIGS. 8A and 8B determines whether a location corresponding to an activation position of one of the use records of the preceding application and a location corresponding to an activation position of one of the candidate applications relative to the preceding application are the same as each other. Furthermore, the processor 17 calculates a location evaluation value for each candidate application in accordance with a result of the determination of the location and calculates a recommendation evaluation value representing the location relationship in which the location evaluation value is reflected for each candidate application.

When the location corresponding to the activation position of one of the use records of the preceding application and the location corresponding to the activation position of one of the candidate applications relative to the preceding application are not the same as each other, the processor 17 determines that the location relationship between the preceding application and the candidate application is weak. Then the processor 17 sets 0 to the location evaluation value of the candidate application relative to the preceding application.

When the location corresponding to the activation position of one of the use records of the preceding application and the location corresponding to the activation position of one of the candidate applications relative to the preceding application are the same as each other, the processor 17 determines that the location relationship between the preceding application and the candidate application is strong. Then the processor 17 sets the location evaluation value of the candidate application relative to the preceding application comparatively high. Accordingly, the processor 17 may calculate recommendation evaluation values representing the location relationships between the candidate applications and the preceding application by adding location evaluation values calculated for individual candidate applications to recommendation evaluation values representing the location relationships between the candidate applications and the preceding application.

Figure 9:
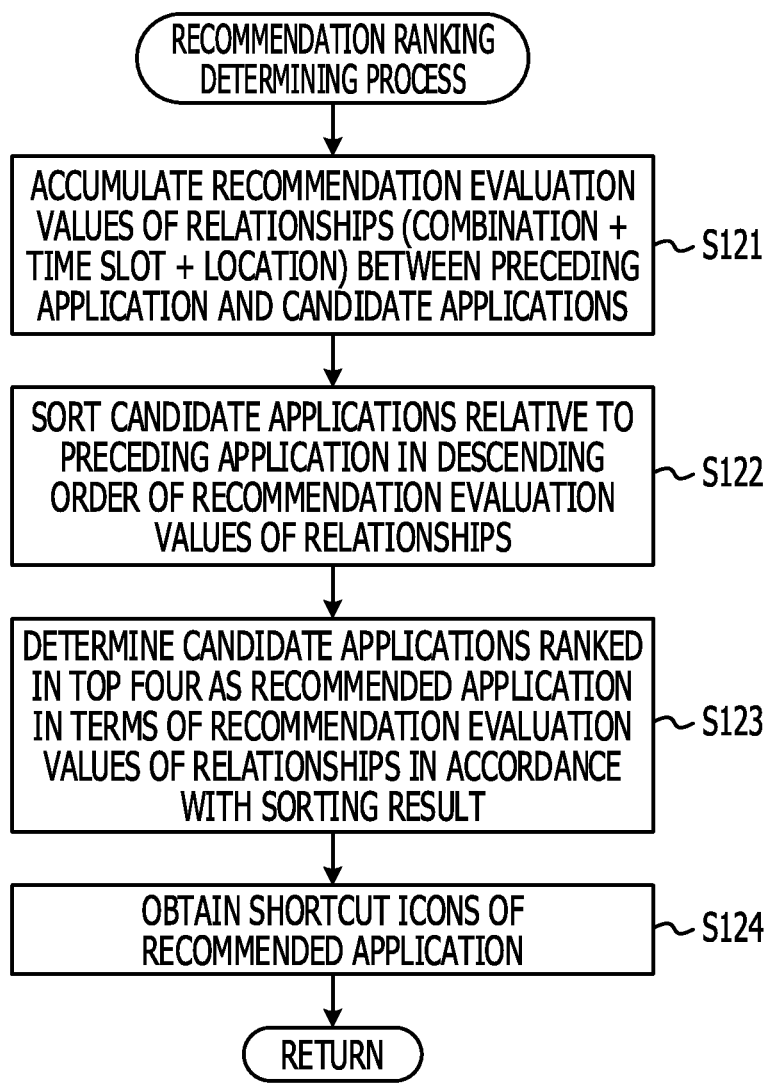
FIG. 9 is a flowchart illustrating an exemplary processing operation of the processor included in the information terminal which relates to a recommendation ranking determining process.

FIG. 9 is a flowchart illustrating an exemplary processing operation of the processor 17 included in the information terminal 1 which relates to the recommendation ranking determining process. In the recommendation ranking determining process illustrated in FIG. 9, recommendation ranking of the candidate applications relative to the preceding application is determined in accordance with the recommendation evaluation values representing the combination relationships, the recommendation evaluation values representing the time-slot relationships, the recommendation evaluation values representing the location relationships for individual candidate applications relative to the preceding application.

In FIG. 9, the determination unit 40 included in the processor 17 accumulates the recommendation evaluation values of the relationships between the candidate applications and the preceding application (step S121). The determination unit 40 accumulates the recommendation evaluation values $Em(A, B)$ representing the combination relationships obtained for individual candidate applications, the recommendation evaluation values $Et(A, B)$ representing the time-slot relationships obtained for individual candidate applications, and the recommendation evaluation values $Ep(A, B)$ representing the location relationships obtained for individual candidate applications. Specifically, the determination unit 40 obtains the recommendation evaluation values $E(A, B)$ representing the relationships for individual candidate applications which are results of the accumulation performed in accordance with the following equation:

$$E(A,B)=Em(A,B)+\alpha(A)\times Et(A,B)+\beta(A)\times Ep(A,B).$$

Note that dependence property of a time slot when the preceding application is evaluated using a histogram estimation method, for example, that is, continuous probability distribution of the activation times of the preceding application is obtained and an estimated occurrence probability of activation of the preceding application at a present time is represented by "$\alpha(A)$". Note that dependence property of a location where the preceding application is evaluated using a histogram estimation method, that is, continuous probability distribution of the activation positions of the preceding application is obtained and an estimated occurrence probability of activation of the preceding application at a present location is represented by "$\beta(A)$".

The determination unit 40 sorts the recommendation evaluation values representing the relationships between the candidate applications and the preceding application in descending order in accordance with the accumulation result (step S122).

The determination unit 40 determines the applications ranked in the top four in terms of the recommendation evaluation values representing the relationships as recommended applications in accordance with a result of the sorting (step S123). The display controlling unit 41 included in the processor 17 obtains the icons 13B of shortcuts corresponding to the determined recommended applications (step S124), and the processing operation of FIG. 9 is terminated.

The processor 17 performing the recommendation ranking determining process illustrated in FIG. 9 accumulates the recommendation evaluation values representing the combination relationships, the recommendation evaluation values representing the time-slot relationships, the recommendation evaluation values representing the location relationships for individual candidate applications relative to the preceding application and determines the recommendation ranking of the recommended applications in accordance with a result of the accumulation. Thereafter, the processor 17 obtains the icons 13B corresponding to the determined recommended applications and displays the icons 13B in the recommended-application display region 13A of the display unit 13. Consequently, the processor 17 displays the icons 13B in the display screen so as to offer the recommended applications in which the user's will is reflected after the preceding application is terminated.

FIG. 10 is a diagram illustrating an exemplary screen change of one of the recommended applications in the information terminal 1. The home screen illustrated in FIG. 10 includes the recommended-application display region 13A capable of displaying the icons 13B of the shortcuts of the four recommended applications, for example. In the example of FIG. 10, it is assumed that the information terminal 1 displays the icons 13B, that is, icons of applications App-A, App-B, App-C, and App-D in the home screen. When detecting an operation of touching one of the icons 13B, for example, the icon of the application App-C, in the display screen, the information terminal 1 displays a screen of the application App-C. When the application App-C is terminated, the information terminal 1 executes a process of displaying recommended applications for the application App-C serving as the preceding application. Accordingly, the information terminal 1 determines recommendation ranking for the application App-C. As the recommendation ranking, the application App-D has a first rank, the application App-B has a second rank, an application App-F has a third rank, and an application App-G is a fourth rank. Consequently, the information terminal 1 displays the icons 13B representing the application App-D which is the first rank, the application App-B which is the second rank, the application App-F which is the third rank, and the application App-G which is the fourth rank in the recommended-application display region 13A as candidate applications which have the strong relationships with the application App-C serving as the preceding application and which have high possibility of next activation. When detecting an operation of touching one of the icons 13B displayed in the recommended-application display region 13A of the home screen, the information terminal 1 may activate one of the applications corresponding to the touched icon 13B.

The information terminal 1 of this embodiment determines the recommendation ranking of the candidate applications relative to the preceding application while the user's will is reflected taking the combination relationships, the time-slot relationships, and the location relationships into consideration and displays the icons 13B of the recommended applications obtained in accordance with the recommendation ranking in the recommended-application display region 13A. As a result, the user sees the recommended-application display region 13A and recognizes applications which have strong relationships with the preceding application among a number of applications while the user's will is reflected. Accordingly, a load of searching for the applications having the relationships may be reduced.

The information terminal 1 determines the recommendation ranking of the candidate applications relative to the preceding application in accordance with the recommendation evaluation values representing the combination relationships in which the combination evaluation values are reflected for individual candidate applications relative to the preceding application. Accordingly, the recommended applications having the strong combination relationships with the preceding application may be displayed while the user's will is reflected.

The information terminal 1 determines the recommendation ranking of the candidate applications relative to the preceding application in accordance with the recommendation evaluation values representing the time-slot relationships in which the time-slot evaluation values are reflected for individual candidate applications relative to the preceding application. Accordingly, the recommended applications having the strong time-slot relationships with the preceding application may be displayed while the user's will is reflected.

The information terminal 1 determines the recommendation ranking of the candidate applications relative to the preceding application in accordance with the recommendation evaluation values representing the location relationships in which the location evaluation values are reflected for individual candidate applications relative to the preceding application. Accordingly, the recommended applications having the strong location relationships with the preceding application may be displayed while the user's will is reflected.

The information terminal 1 displays the icons 13B of the recommended applications in the recommended-application display region 13A in accordance with the recommendation ranking of the candidate applications relative to the preceding application. As a result, the user sees the icons 13B in the recommended-application display region 13A so as to recognize the recommended applications, and in addition, the user may activate each of the recommended applications with ease by an operation of touching a corresponding one of the icons 13B.

In the information terminal 1 of this embodiment, when an application is terminated, use records of the terminated application are not registered in the use record DB 20 in a single uniform way, but the use records of the terminated application are registered only when a period of time in which the terminated application is used is equal to or larger than a predetermined period of time. Thereafter, the information terminal 1 determines recommendation ranking of candidate applications in accordance with the relationships between the terminated application, that is, the preceding application, and the candidate applications with reference to the use record DB 20. Although an application is mistakenly operated or happens to be activated for a short period of time in some cases, for example, use of this technique may reduce a load of a process of comparing the preceding application with the candidate applications which is unproductively performed since a use record of the application which is mistakenly operated or happens to be activated is registered.

In the foregoing embodiment, the four recommended applications may be displayed as the icons 13B in the recommended-application display region 13A of the home screen. However, the number of recommended applications is not limited to four and may be appropriately changed.

Although the information terminal 1 of this embodiment includes the use record DB 20, a management server which integrally manages use records of the applications of the information terminals 1 may be separately provided and the use records may be obtained from the management server. In this case, the information terminal 1 may considerably reduce storage capacity for storing the use records.

The information terminal 1 of this embodiment determines a case where the home screen application or a multi-task switching application is interposed between an end of use of an application and a start of use of another application in accordance with an operation of switching applications performed by the user as application switching. Accordingly, since switching between a first application and a second application which is automatically performed after the first application is terminated, for example, does not reflect the user's will, this switching between applications is not included in the application switching.

Furthermore, in the foregoing embodiment, the application switching is detected in the combination evaluation value calculating process, the time-slot evaluation value calculating process, and the location evaluation value calculating process in accordance with the use records. However, the application switching may be detected at a time of registration of a use record and registered as the use record.

Furthermore, it is not necessarily the case that the components of the units in the drawings are physically configured as illustrated. Specifically, concrete embodiments of distribution and integration of the units are not limited to those illustrated and entire or part of the units may be functionally or physically configured in a distributed manner or integrated manner in an arbitrary unit in accordance with various loads and use situations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a memory that stores instructions; and
a processor coupled to the memory and configured by execution of the instructions to:
store first transition information and first time information into the memory, the first transition information indicates information of a second activation control application, which is usable to control activation of at least one application, that entered a first inactive state after a first application entered an active state, the first time information indicates a first time point when the first application entered the active state and a second time point when the second activation control application entered the first inactive state after the first application entered the active state;
store a second transition information and second time information into the memory, the second transition information indicates information of a third application that entered the active state after the second activation control application entered a second inactive state, the second time information indicates a third time point when the third application entered the active state and a fourth time point when the second activation control application entered the second inactive state after the third application entered the active state; and
in response to reentry of the second activation control application to the active state for controlling the activation of the at least one application, suggest at least one candidate application among the at least one application except for the second activation control application based on,
identification of the first and third applications as candidate applications that entered the active state after the second activation control application entered the first and second inactive states, based on the first and second transition information,
calculation, by referring to the first and second time information, respective relationship evaluation values for the candidate first and third applications, based on
a first time period from the first time point of when the candidate first application entered the active state to the second time point of when the second activation control application entered the first inactive state and
a second time period from the third time point of when the candidate third application entered the active state to the fourth time point of when the second activation control application entered the second inactive state, and
suggest the at least one candidate application among the candidate first and third applications, according to whether the respective relationship evaluation values for the candidate first and third applications exceed a threshold,
wherein the second activation control application in the active state,
displays a first screen as a home screen including one or more icons including a first icon corresponding to the first application, the first application being entered in the active state when the first icon is selected from among the one or more icons, and
displays a second screen as the home screen including at least one icon corresponding to the suggested at least one candidate application and not including the first icon,
when the at least one candidate application are a plurality of candidate applications for which the respective relationship evaluation values are calculated, displays a plurality of icons corresponding to the candidate applications according to rankings based upon the calculated relationship evaluation values.

2. The information processing apparatus according to claim 1, wherein to suggest the at least one candidate application, the processor is further configured to
calculate respective performance evaluation values for the candidate first and third applications in accordance with a first number of times the first application enters the active state after the second activation control application and a second number of times the third application enters the active state after the second activation control application, and
suggest the at least one candidate application, according to respective recommendation values for the first and third applications based upon the respective relationship and performance evaluation values for the first and third applications.

3. The information processing apparatus according to claim 1, wherein the processor is further configured to suggest the at least one candidate application in accordance with a first active time point when the first application enters the active state, a second active time point when the second activation application enters the active state, and a third active time point when the third application enters the active state.

4. The information processing apparatus according to claim 1, wherein the processor is further configured to suggest the at least one candidate application in accordance with a first location in a screen where the first application is activated, a second location in the screen where the second activation control application is activated, and a third location in the screen where the third application is activated.

5. An application control method executed by an information processing apparatus, the application control method comprising:
executing by the information processing apparatus:
storing first transition information and first time information into a memory, the first transition information indicates information of a second activation control application, which is usable to control activation of at least one application, that entered a first inactive state after a first application entered an active state, the first time information indicates a first time point when the first application entered the active state and a second time point when the second activation control application entered the first inactive state after the first application entered the active state;
storing a second transition information and second time information into a memory, the second transition information indicates information of a third application that entered the active state after the second activation control application entered a second inactive state, the second time information indicates a third time point when the third application entered the active state and a fourth time point when the second activation control application entered the second inactive state after the third application entered the active state; and in response to reentry of the second activation control application to the active state for controlling the activation of the at least one application, suggesting at least one candidate application among the at least one application except for the second activation control application by:
- identifying the first and third applications as candidate applications that entered the active state after the second activation control application entered the first and second inactive states, based on the first and second transition information,
- calculating, by referring to the first and second time information, respective relationship evaluation values for the candidate first and third applications, based on
  - a first time period from the first time point of when the candidate first application entered the active state to the second time point of when the second activation control application entered the first inactive state and
  - a second time period from the third time point of when the candidate third application entered the active state to the fourth time point of when the second activation control application entered the second inactive state, and
- suggesting the at least one candidate application among the candidate first and third applications, according to whether the respective relationship evaluation values for the candidate first and third applications exceed a threshold,
- wherein entering of the second activation control application to the active state, causes the second activation control application to,
  - display a first screen as a home screen including one or more icons including a first icon corresponding to the first application, the first application being entered in the active state when the first icon is selected from among the one or more icons, and
  - display a second screen as the home screen including at least one icon corresponding to the suggested at least one candidate application and not including the first icon,
  - when the at least one candidate application are a plurality of candidate applications for which the respective relationship evaluation values are calculated, display a plurality of icons corresponding to the candidate applications according to rankings based upon the calculated relationship evaluation values.

6. The application control method according to claim 5, wherein the suggesting the at least one candidate application comprises:
- calculating respective performance evaluation values for the candidate first and third applications in accordance with a first number of times the first application enters the active state after the second activation control application and a second number of times the third application enters the active state after the second activation control application, and
- suggesting the at least one candidate application, according to respective recommendation values for the first and third applications based upon the respective relationship and performance evaluation values for the first and third applications.

7. The application control method according to claim 5, wherein the suggesting suggests the at least one candidate application in accordance with a first active time point when the first application enters the active state, a second active time point when the second activation control application enters the active state, and a third active time point when the third application enters the active state.

8. The application control method according to claim 5, wherein the suggesting suggests the at least one candidate application in accordance with a first location in a screen where the first application is activated, a second location in the screen where the second activation control application is activated, and a third location in the screen where the third application is activated.

9. A non-transitory information storage storing at least one program which when executed by at least one processor cause the at least one processor to execute:
- storing first transition information and first time information into a memory, the first transition information indicates information of a second activation control application, which is usable to control activation of at least one application and that entered a first inactive state after a first application entered an active state, the first time information indicates a first time point when the first application entered the active state and a second time point when the second activation control application entered a first inactive state after the first application entered the active state;
- storing a second transition information and second time information into the memory, the second transition information indicates information of a third application that entered the active state after the second activation control application entered a second inactive state, the second time information indicates a third time point when the third application entered the active state and a fourth time point when the second activation control application entered the second inactive state after the third application entered the active state; and
- in response to reentry of the second activation control application to the active state for controlling the activation of the at least one application, suggesting at least one candidate application among the at least one application except for the second activation control application by:
  - identifying the first and third applications as candidate applications that entered the active state after the second activation control application entered the first and second inactive states, based on the first and second transition information,
  - calculating, by referring to the first and second time information, respective relationship evaluation values for the candidate first and third applications, based on
    - a first time period from the first time point of when the candidate first application entered the active state to the second time point of when the second activation control application entered the first inactive state and
    - a second time period from the third time point of when the candidate third application entered the active state to the fourth time point of when the second activation control application entered the second inactive state, and
  - suggesting the at least one candidate application among the candidate first and third applications, according to whether the respective relationship evaluation values for the candidate first and third applications exceed a threshold, wherein entering of the second activation control application to the active state, causes the second activation control application to,
- display a first screen as a home screen including one or more icons including a first icon corresponding to the first application, the first application being entered in the active state when the first icon is selected from among the one or more icons, and
- display a second screen as the home screen including at least one icon corresponding to the suggested at least one candidate application and not including the first icon,
- when the at least one candidate application are a plurality of candidate applications for which the respective relationship evaluation values are calculated, display a plurality of icons corresponding to the candidate applications according to rankings based upon the calculated relationship evaluation values.

* * * * *